Figure 1:
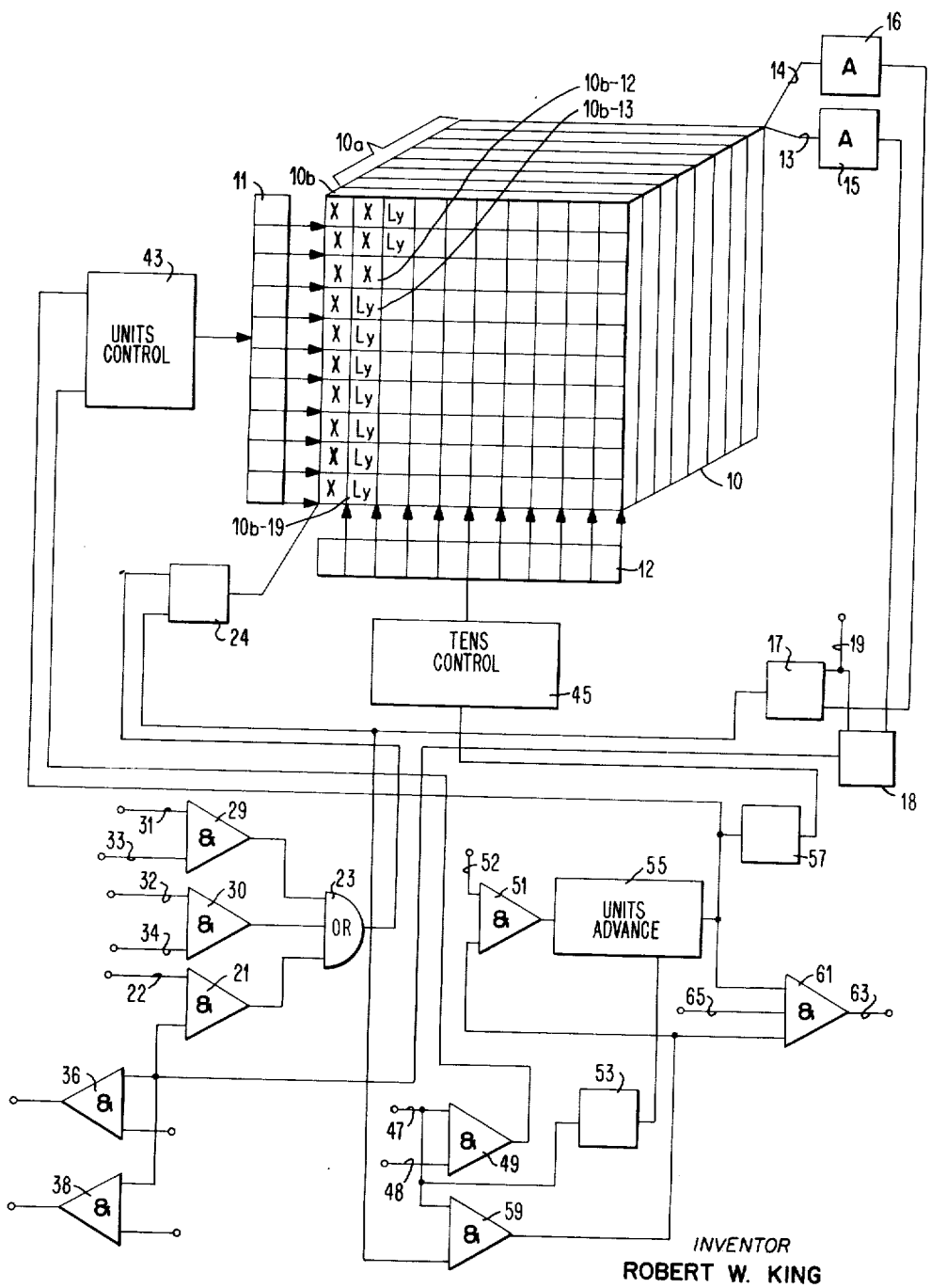

INVENTOR
ROBERT W. KING

United States Patent Office 3,200,378
Patented Aug. 10, 1965

3,200,378
DATA INPUT/OUTPUT DEVICE
Robert W. King, Endicott, N.Y., assignor to International Business Machines Corporation, New York, N.Y., a corporation of New York
Filed Dec. 28, 1960, Ser. No. 78,895
4 Claims. (Cl. 340—172.5)

This invention relates to a data input/output apparatus for a data processing machine and in particular to an input/output apparatus associated with a selectably addressable storage in which data is to be stored or retrieved sequentially at discontinuous intervals of time.

The speed of a data processing machine in performing operations could be generally classified on the basis of the rate of the machine in moving data from one portion of the machine to another, performing the operation specified, and returning the results of an operation to a specified location. While this is a good indication of the speed to be expected from the machine, it is also quite apparent that any operation of the machine which necessitates more than the minimum number of cycles to achieve some operation reduces the overall speed of the machine to less than its general cycle rate would indicate. Thus, any reduction in the number of cycles necessary for a given operation improves the overall speed of the machine and makes it less costly in terms of operation time.

The present invention is situated in the input/output portion of a data processing machine and is used to reduce the time necessary to move information into or out of the machine. The particular data processing machine to which this invention has been associated contains a core storage addressable sequentially by position for sequential data. However, the input/output addressing operation is or may be aperiodically interrupted. When this occurs, it is necessary upon resuming the input/output operation to locate the next sequential available storage location. One obvious method is to start at the beginning of the storage device and proceed until the first available data position is found. This, of course, demands a great number of machine cycles. The present invention provides apparatus for substantially reducing this procedure to a minimum number of machine cycles.

It is therefore an object of the present invention to provide an improved data input/output apparatus in which the first available data storage position for input/output data may be quickly determined.

It is a further object of the present invention to provide a data storage apparatus in which the first available storage location may be located without searching all preceding locations.

Another object of the present invention is to provide an indicating apparatus for a data storage in which a signal is generated when the first available location is located.

Still another object is to provide apparatus for storing information sequentially but aperiodically and relocating the next available data position when information is again presented for storage.

The foregoing and other objects, features and advantages of the invention will be apparent from the following more particular description of a preferred embodiment of the invention, as illustrated in the accompanying drawings.

Figure 2:
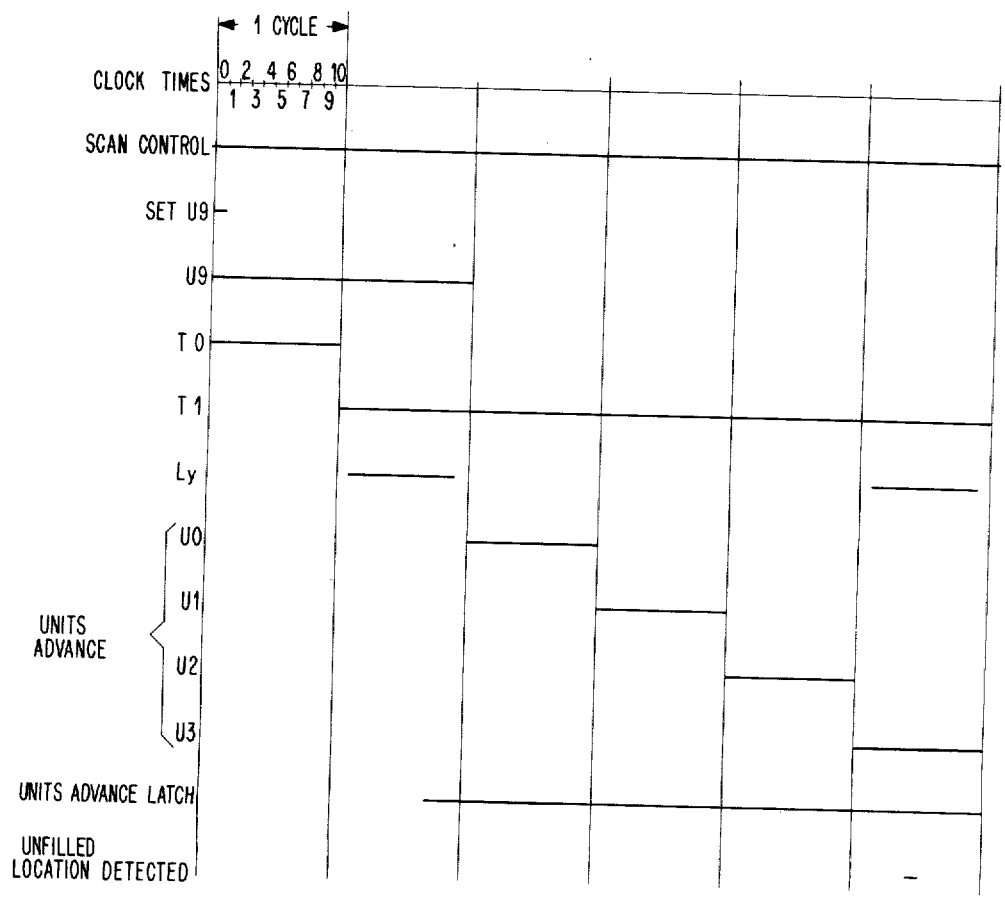

In the drawings:
FIG. 1 is a schematic illustration of the invention.
FIG. 2 is a timing chart of the operation of the apparatus of FIG. 1.

So that the invention will be better understood, a short description of the environment in which the invention is contained has been included in the following description.

A core storage array 10 contains eight planes of magnetic cores; seven planes 10a to represent a character contained therein and one plane 10b for utilization in the present invention. Each coordinate position then has eight cores associated therewith which represent a character and a signal bit. These magnetic cores as well known in the art have a substantially square hysteresis loop and can be set in either an upper (binary 1) or lower (binary 0) position to represent the presence or absence of a bit of the character.

By appropriate windings from address ring 11 and 12, sufficient current can be induced in a particular coordinate position of cores to reset the same to binary zero. If these cores or some combination thereof were previously set to binary 1, then the change in magnetic state will generate a field which may be detected by output windings shown generally as output windings 13 and 14 to denote the character standing at that coordinate position.

The seven data core positions represent the bits A, B, C, 1, 2, 4, 8 by which the numerals are represented by the presence of bits at selected binary positions 1, 2, 4, 8 sufficient to represent the decimal equivalent. Alpha numeric characters are represented by combinations of AB bits and the binary bit position. Bit position C is a redundancy check bit position.

When a coordinate position has current supplied thereto by the tens and units drivers, the data character will appear on line 13, representing seven bits in lines in actuality. The eighth bit would appear on output 14. A current pulse on these eight lines is amplified by amplifier 15 (seven) and amplifier 16. The data character representation is recirculated through AND circuit 21, suitably enabled by a signal on line 22, through OR circuit 23, to the inhibit drivers 24. Bistable storage devices 17 and 18 are set by the current pulses from amplifiers 15 and 16 and reset at time "10," input 19, to maintain the outputs over one cycle.

As mentioned previously on readout of information from a storage position, the current flow from the units ring and the tens ring is sufficient at the column of cores at that position to switch all cores to a binary zero state. When reading into storage 10, the currents are in an opposite direction to set all cores at that position to a binary 1. To achieve an information storage at a particular location, it is necessary to control the cores which will be set to binary 1. This is accomplished by the inhibit drivers 24 which furnish sufficient current in the opposite direction to inhibit the switching process. When there is an output to the inhibit driver 24, the corresponding lines from drivers 24 to core array do not carry current and the cores will be set to indicate this coded representation.

Reference may be had to Patent No. 2,939,120, May 31, 1960, for details of this readin or readout of information.

Data is introduced into the core array 10 by AND circuits 29 and 30 connected respectively to the output of some input device by line 31 and timed by a signal at 33; or from a central processing unit by line 32 and timed by a signal at 34. AND circuits 36 and 38 are the outputs respectively to the same devices.

In the ordinary instance data would be introduced through AND circuit 29 in timed relation to the addressing of the units and tens rings so that each data character would be recorded in the next successive position. The address rings could be as shown in the above-mentioned patent wherein the units ring steps through the units position once for each successive step of the tens ring. The only necessary qualification here is that applicant's numbering is from 0–9 while the patent shows numbering from 1–10 and that in utilizing apparatus such as the patentee shows, applicant would use stage 10 of the units ring instead.

The units ring control 43 is a bistable element able to furnish two signals to the units address ring 11, enabling ring 11 to remain in address position 9 so long as a signal is applied. This in the above-mentioned patent could be a signal introduced onto the plugboard for all 10's position, 10, 20, 30 etc., while the run signal is merely the enabling signal to allow advance of the units ring 11.

In operation of the present invention, when information is to be introduced into the storage 10 and it is necessary to determine the first unfilled location, a scan control input 47 has a signal applied thereto to condition AND circuits 49 and 50, see FIG. 2 for the signals applied and their duration. A setup signal labelled Set U9, input 48, FIG. 2, is also applied to AND circuit 49 to provide an output to the bistable device 43 to condition the 9's position of the units advance ring 11. At the same time, a signal from scan control input 47 applied through an inverter 53 is used to remove the reset signal from a bistable device 55 which in turn does not generate a signal to advance the units addressing 11 by the control unit 43. The output of bistable device 55, now at a lowered voltage output, is connected to inverter 57 to provide an output signal to a tens ring control 45 which allows stepping of the tens ring 12. The output signal from the tens zero position of the tens address ring 12 is shown at T0, FIG. 2, and for the tens unit position at T1, FIG. 2.

In the absence of any other control, the units position ring would remain at position 9 while the tens ring would step successively from 0–9 so that positions 09, 19, 29, 39, 49, 59, etc., would be selected and read out to the sense amplifiers 15 and 16.

However, in the present illustration of the invention, information in the storage 10 has been taken to have been filled in locations 00–12 shown by the presence of x's in FIG. 1. This represents the absence of a binary 1, or a binary 0, in this core plane. Position 10b–13, FIG. 1 shows a symbol Ly which is the presence of a bit and denotes that this storage location 13 is next available for the reception of data.

When the tens ring 45 is standing at the units position T1, the digit position 19 is read from storage 10 and the presence of a bit is detected by amplifier 16 stored in bistable device 17 and fed to AND circuit 59 which, with an output scan control 47, provides an input to AND 51 at clock time 8, line 52 to set the unit advance bistable device 55. The output from the device 55 switches the units ring control and starts the units ring to counting 0, 1, 2, 3, 4, etc. At the same time, the tens advance ring control is disabled allowing the tens ring to advance only when the units ring counts past 9.

While the Ly bit 10b–19 was detected by amplifier 16 and fed to AND circuit 59, the units advance latch 55 was not enabled until "8" time of that cycle. An AND circuit 61 enabled at "4" time and having a signal output 63 indicative of the first unfilled location is not enabled. Bistable device 55 was set at "8" time of the cycle in which Ly bit 10b–19 was readout but the AND circuit 61 is not enabled by an input 65 until "4" time which occurs in the next successive cycle. In the next successive cycle the presence of a bit is not detected by AND circuit 59 so that no output is provided to AND circuit 61.

When the digit position 13 is readout, an Ly bit is detected and AND circuit 59 provides an output to AND 61 which provides an output 63 at "4" time which is used to gate information into the proper location then being sensed.

While no reference has been made to the inclusion of Ly bits where no information is present, it can be readily appreciated that the inhibit driver 24 which provides disabling current for these stages not being set to a binary 1 would control the inhibit driver for core plane 10b so that disabling current would be provided when any data was being entered into storage 10 but would work conversely when data was present.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data input/output apparatus comprising a data storage device for storing a plurality of characters each at a unique coordinate position, each said coordinate position including a plurality of bistable elements indicative of the data contained at said position and a control bistable element indicative of the presence of data at that position, output means common to all said coordinate positions to detect a data character and the presence of data when a coordinate position is sensed, a units address ring having a plurality of stages operable successively to supply a plurality of individual outputs, means for connecting each individual output of said units address ring as a coordinate of said storage device, a group address ring having a plurality of stages and operable successively in response to the operation of all stages in said units ring to provide an output successively for each stage, means for connecting each individual output of said group address ring as a coordinate of said storage device, means for combining said outputs of said units and group rings at each coordinate position of data storage whereby simultaneous outputs from the units ring and group ring sense each coordinate position, by the output of a unique combination of stages of said rings, means for setting a given stage in said units ring to provide an output therefrom, means for enabling said group ring whereby an output is taken from successive stages whereby a character position in successive groups of character positions is sensed, means connected to said output means and responsive to the presence of a bit in said control element, output indicative that a data character is absent to enable said units address register to selectively address the character positions in said group, and means connected to said output means and responsive to an indication of the absence of a data character by said control element in the next successive position for generating a signal indicative of the first unfilled character position.

2. The apparatus of claim 1 wherein said units address ring steps from zero to nine and said group address ring is indicative of the tens position, said preset stage of said units position being nine, and means responsive to the enabling of the units ring for disabling said group ring whereby the absence of an indication of a data character by a control bistable device results in the units ring stepping successively through the tens decade in which absence of a data character was detected.

3. A data input/output apparatus for reading data into or out of a processing machine comprising a data storage device for storing a plurality of characters each at a unique coordinate position, each said coordinate position including a plurality of magnetic cores capable of being set to a magnetic state indicative of a binary "1" or "0", said plurality of cores being indicative of a data character and a control bit, binary "1", indicative of the absence of a data character at said position, said plurality of coordinate position being divided into a series of groups and subdivided into single positions, a units address register operable to successively and repetitively provide a current pulse to each of said single positions, a tens address register operable to supply a current pulse successively to each of said group of positions in response to the termination of a current pulse to the last position of said units address register, each said core in a coordinate position being switched by the combined currents from said units and tens address register, data input means operable in timed relation to the switching of each coordinate position to store data therein, means for ascertaining the first unfilled storage location in said storage device including means responsive to an initiating signal for presetting said units address ring to provide current to the 9's position in each decade, means responsive to said initiating signal for stepping said tens address ring successively from decade to decade, means responsive to the detection by said output means of a control bit for disabling said tens address ring to allow current to flow to said tens decade then being sensed and for enabling said units decade to count successively from nine, and means responsive to the detection of a second control bit for generating a signal indicative of the unfilled location.

4. The apparatus of claim 3 wherein said means for detecting said first control bit includes a bistable device set to a first position indicative of the presence of a bit wherein said means for detecting said second control bit is responsive to the output of said bistable device in a first position and the occurrence of a control bit.

References Cited by the Examiner

UNITED STATES PATENTS

| | | | |
|---|---|---|---|
| 2,939,120 | 5/60 | Estrems | 340—166 |
| 3,108,256 | 10/63 | Buchholz et al. | 340—172.5 |
| 3,108,257 | 10/63 | Buchholz | 340—172.5 |

MALCOLM A. MORRISON, *Primary Examiner.*

IRVING L. SRAGOW, *Examiner.*